US008626004B2

(12) United States Patent
Ito et al.

(10) Patent No.: US 8,626,004 B2
(45) Date of Patent: Jan. 7, 2014

(54) DETECTING APPARATUS AND IMAGE FORMING APPARATUS

(75) Inventors: Masao Ito, Ashigarakami-gun (JP); Fumio Furusawa, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 295 days.

(21) Appl. No.: 13/110,419

(22) Filed: May 18, 2011

(65) Prior Publication Data

US 2012/0097872 A1 Apr. 26, 2012

(30) Foreign Application Priority Data

Oct. 22, 2010 (JP) ................................ 2010-238002

(51) Int. Cl.
*G03G 15/00* (2006.01)

(52) U.S. Cl.
USPC ........................................................... 399/15

(58) Field of Classification Search
USPC ................................................ 399/15, 60, 74
See application file for complete search history.

(56) References Cited

U.S. PATENT DOCUMENTS 6,898,381 B2 * 5/2005 Maebashi et al. ............... 399/15
6,961,526 B2 * 11/2005 Tezuka et al. .................. 399/15
2010/0189447 A1 * 7/2010 Ishizuka et al. ................ 399/15

FOREIGN PATENT DOCUMENTS

JP 2010-114498 A 5/2010

* cited by examiner

*Primary Examiner* — Sandra Brase
(74) *Attorney, Agent, or Firm* — Sughrue Mion, PLLC

(57) ABSTRACT

A detecting apparatus includes: a transmission member that is provided facing a conveying path on which a medium is conveyed and that transmits light from the medium being conveyed on the conveying path; a detecting section that detects the medium or an image on the medium from the light which is transmitted through the transmission member, wherein the light is received by a light-receiving member of the detection section; an opposing member that is provided on an opposite side of the conveying path from the transmission member and has at least a first opposing surface that faces the transmission member; and a guide member provided at a downstream side of the opposing member in the conveying direction, and guides the medium downstream in the conveying path. The opposing surface is closer to the detecting section at a downstream side than at an upstream side thereof in the conveying direction.

12 Claims, 9 Drawing Sheets

DETECTING APPARATUS AND IMAGE FORMING APPARATUS

CROSS-REFERENCE TO RELATED APPLICATION

This application is based on and claims priority under 35 USC 119 from Japanese Patent Application No. 2010-238002 filed on Oct. 22, 2010.

BACKGROUND

Technical Field

The present invention relates to a detecting apparatus and an image forming apparatus.

SUMMARY

A detecting apparatus according to a first aspect of the present invention includes: a transmission member that is provided facing a conveying path on which a medium is conveyed and that transmits light from the medium being conveyed on the conveying path; a detecting section that detects the medium or an image on the medium from the light which is transmitted through the transmission member, wherein the light is received by a light-receiving member of the detection section; an opposing member that is provided on an opposite side of the conveying path from the transmission member and has at least a first opposing surface that faces the transmission member; and a guide member that is provided at a downstream side of the opposing member in the conveying direction, and guides the medium downstream in the conveying path, wherein the opposing surface is closer to the detecting section at a downstream side than at an upstream side thereof in the conveying direction.

BRIEF DESCRIPTION OF THE DRAWINGS

Exemplary embodiments of the present invention will be described in detail based on the following figures, wherein.

DESCRIPTION

An example of a detecting apparatus and an image forming apparatus in an exemplary embodiment of the present invention will be described.

(Overall Configuration)

Figure 1:
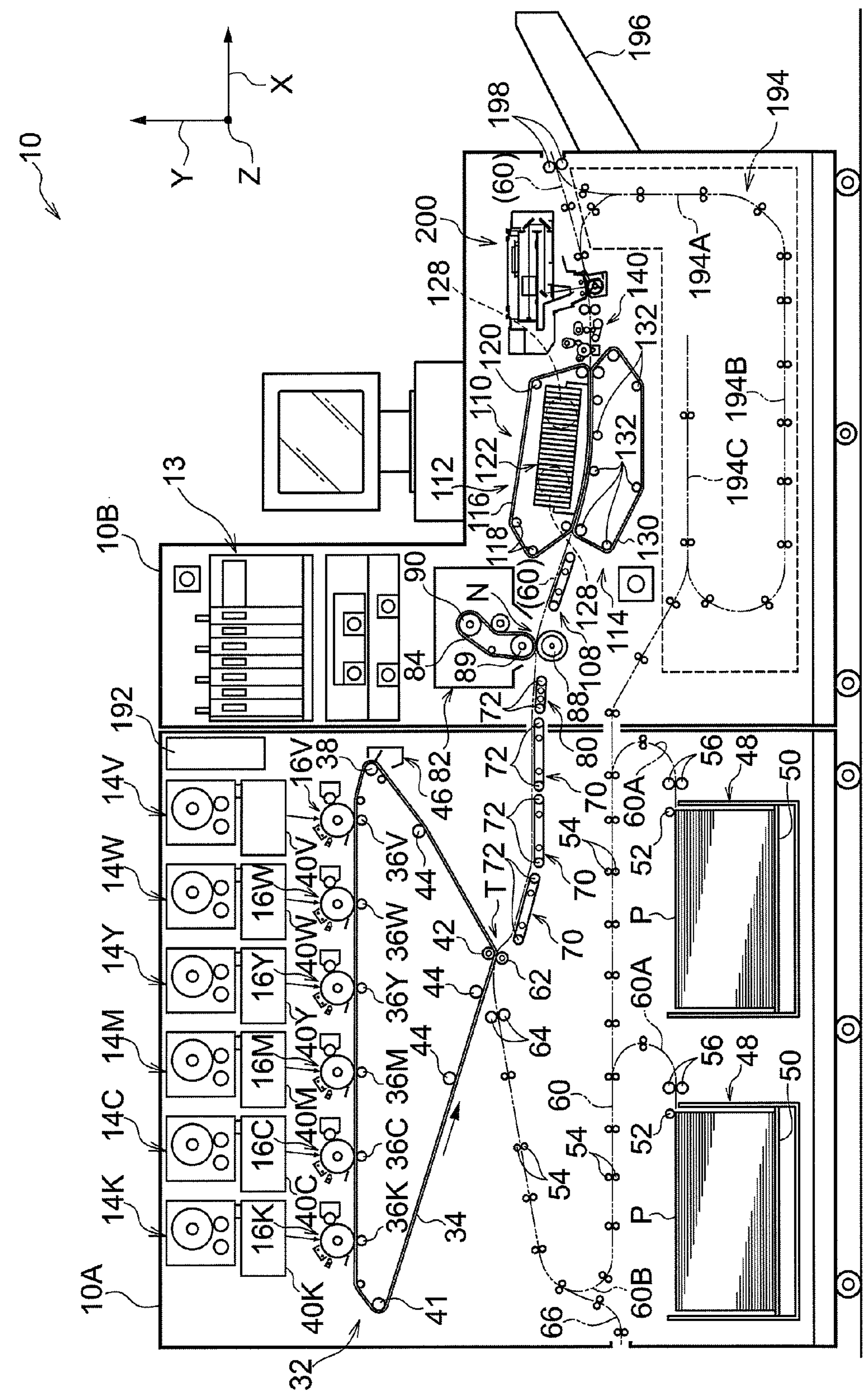
FIG. 1 is an overall view of an image forming apparatus concerning the exemplary embodiment of the present invention.

FIG. 1 shows the image forming apparatus 10. The image forming apparatus 10 is for forming a color image or a monochrome image and has a first processing unit 10A which is located on the left-hand side in anterior view and a second processing unit 10B which is located on the right-hand side and can be attached to and detached from the first processing unit 10A. Casings of the first processing unit 10A and the second processing unit 10B are formed by plural frame members. Moreover, in the following description, a length direction of the image forming apparatus 10 (sub-scanning direction (slow scanning direction)), which is a conveying direction of a recording medium P, which is an example of a medium) is described as the X direction, a height direction of the apparatus is described as the Y direction and a depth direction of the apparatus (main-scanning direction (fast scanning direction)) is described as the Z direction.

Toner cartridges 14V, 14W, 14Y, 14M, 14C, 14K which respectively house each of toners of a first custom color (V), a second custom color (W), yellow (Y), magenta (M), cyan (C) and black (K) are provided so as to be exchangeable at an upper part of the first processing unit 10A along a horizontal direction.

Here, the first custom color and the second custom color are arbitrarily selected from the colors (which include transparent color) other than yellow, magenta, cyan and black. Moreover, in the following description, in a case of distinguishing the first custom color (V), the second custom color (W), yellow (Y), magenta (M), cyan (C) and black (K), it will be explained with any one of alphabets V, W, Y, M, C, K added after the numerical references and, in a case of not distinguishing the first custom color (V), the second custom color (W), yellow (Y), magenta (M), cyan (C) and black (K), the alphabets V, W, Y, M, C, K will be omitted.

Further, at a lower side of the toner cartridges 14, image forming units 16 as an example of six image forming units corresponding to the toners of each of colors are provided along the X direction so as to correspond with each of toner cartridges 14. An exposure device 40 which is provided for each image forming unit 16 is configured such that it receives image data which is applied an image processing by an image signal processing unit 13 provided at an upper part of the second processing unit 10B and, illuminates an optical beam L modulated according to the image data to a photoreceptor 18 (refer to FIG. 2) which will be described below.

Figure 2:
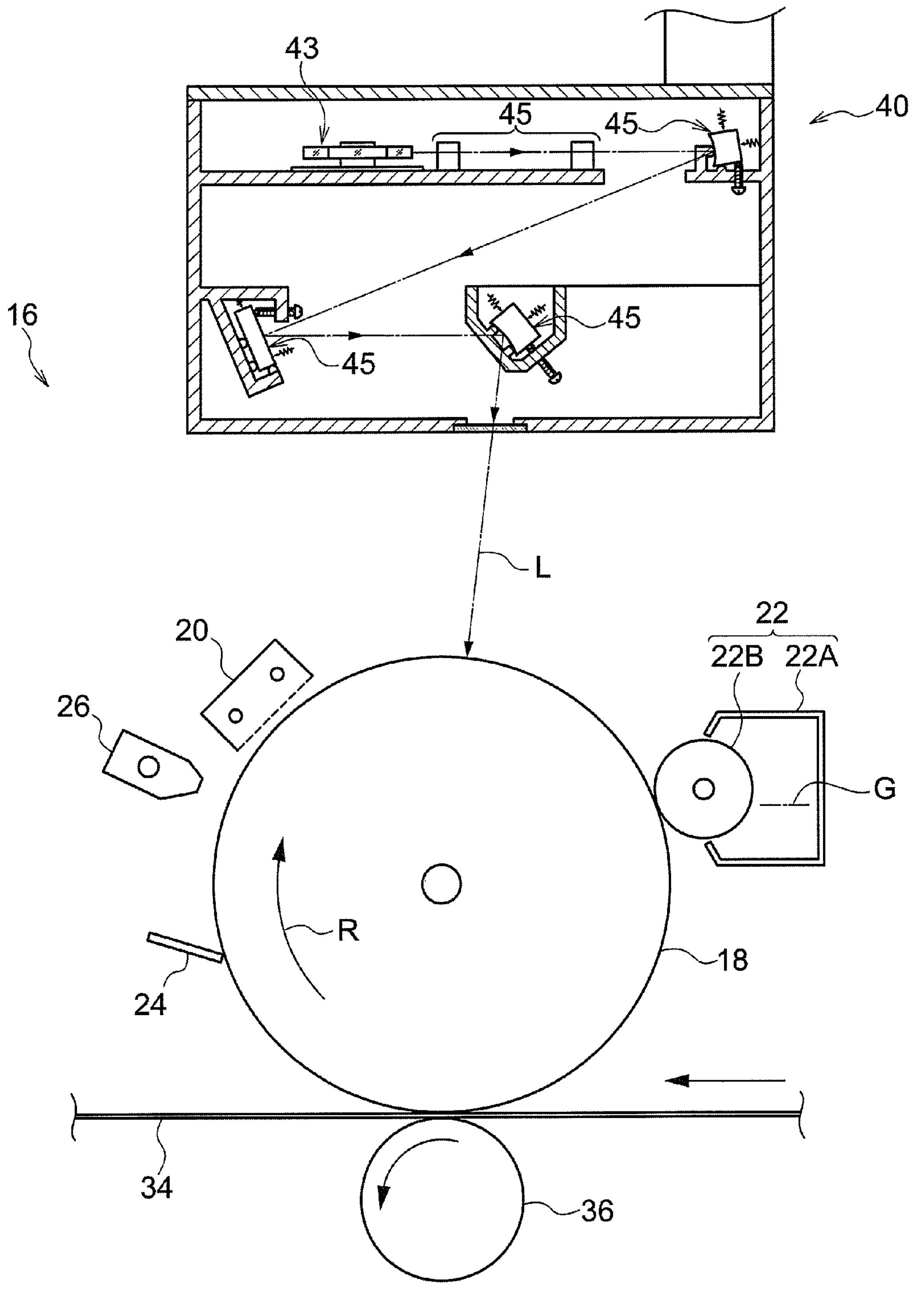
FIG. 2 is a schematic diagram of the image forming unit concerning the exemplary embodiment of the present invention.

As shown in FIG. 2, each image forming unit 16 has a photoreceptor 18 rotary driven in a direction of an arrow R (clockwise direction as shown). On each photoreceptor 18, an electrostatic latent image is formed by illuminating the optical beam L from each exposure device 40. Here, the exposure device 40 scans with the light emitted from a light source (not shown) using a polygon mirror 43, and illuminates with the optical beam L to outer circumference surface of the photoreceptor 18 by plural optical components 45 which respectively include a fθ lens and a reflecting mirror, thus performs exposures.

Around each photoreceptor 18, a scorotron charging device 20 is provided, which is corona discharge type (contactless charge type) and for charging the photoreceptor 18, a developing device 22 is provided, which develops the electrostatic latent image formed on the photoreceptor 18 by the exposure device 40 using a developer (toner), a blade 24 is provided, as a removal member, which removes the developer remaining on the photoreceptor 18 after a primarily transfer, and an erasing apparatus 26 is provided, which illuminates with the light to the photoreceptor 18 after being removed the developer by the blade 24 to perform erasing. The scorotron charging device 20, the developing device 22, the blade 24 and the erasing apparatus 26 are located in this order from the upstream side of a rotation direction of the photoreceptor 18 to the downstream side thereof, facing the surface of the photoreceptor 18.

The developing device 22 is configured so as to include a developer housing member 22A which houses the developer G including the toner and, a developing roll 22B which provides the developer G housed in the developer housing member 22A to the photoreceptor 18. The developer housing member 22A connects to the toner cartridge 14 (refer to FIG. 1) via a toner providing path (not shown), and the toner is provided from the toner cartridge 14.

Meanwhile, as shown in FIG. 1, a transfer unit 32 is provided at a lower side of each image forming unit 16. The transfer unit 32 is configured so as to include a circular intermediate transfer belt 34 of which outer circumference surface contacts with the outer circumference surface of each photoreceptor 18, and a primarily transfer roll 36 as a primarily transfer member for multiply transferring the toner images formed on each of photoreceptors 18 to the intermediate transfer belt 34.

The intermediate transfer belt 34 is wound to a driving roll 38 which is driven by a motor (not shown), a tension applying roll 41 which applies tensional force to the intermediate transfer belt 34, a opposite roll 42 which is opposite to the secondary transfer roll 62 described below, and plural winding rolls 44. The intermediate transfer belt 34 is circularly moved in one direction (counterclockwise direction in the figure) by the driving roll 38.

Each primarily transfer roll 36 is arranged opposite to the photoreceptor 18 of each image forming unit 16 corresponding thereto across the intermediate transfer belt 34. Moreover, a transferring bias voltage which has polarity opposite to toner polarity is applied to the primarily transfer roll 36 by a power feeding unit (not shown). This configuration allows the toner image formed on the photoreceptor 18 to transfer the intermediate transfer belt 34.

At the opposite side of the intermediate transfer belt 34 from the driving roll 38, a removal device 46 is provided, which causes the blade to contact the outer circumferential surface of the intermediate transfer belt 34 to remove residual toner and paper dust or the like from the intermediate transfer belt 34. Moreover, at a lower part of the transfer unit 32, two recording medium housing units 48 are provided, which respectively house recording media such as paper along the horizontal direction.

Each recording medium housing unit 48 can be drawn out toward a front side in the Z direction from the first processing unit 10A. Moreover, at an upper part of one end side (right side in FIG. 1) of each recording medium housing unit 48, a feed roll is provided 52 which sends the recording medium P from the respective recording medium housing units 48 to a conveying path 60, which is an example of a conveying path. Further, a bottom plate 50 is provided on which the recording medium P is placed in each recording medium housing unit 48. The bottom plate 50 is lowered in accordance with an instruction from a controlling device (not shown) when the recording medium housing unit 48 is drawn from the first processing unit 10A. The lowering of the bottom plate 50 forms a space for a user to refill the recording medium P in the recording medium housing unit 48.

When the recording medium housing unit 48 which has been drawn from the first processing unit 10A is attached to the first processing unit 10A, the bottom plate 50 rises in accordance with an instruction from the controlling device. Then, due to the bottom plate 50 rising, the topmost recording medium P placed on the bottom plate 50 contacts the feed roll 52. Moreover, a separating roll 56 is provided which separates any overlapping recording medium P sent from the recording medium housing unit 48 into single sheets, at the downstream side of the feed roll 52 in the a conveying direction of the recording medium (hereinafter, sometimes simply referred to as the downstream side). Plural conveying rolls 54 are provided at the downstream side of the separating roll 56, which convey the recording medium P to the downstream side in the conveying direction.

A conveying path 60 extends toward a transferring position T between the secondary transfer roll 62 and the opposite roll 42 such that the recording medium P sent from the recording medium housing unit 48 is turned to the left side in FIG. 1 at a first turning part 60A, further is turned to the right side in FIG. 1 at a second turning part 60B.

The secondary transfer roll 62 is configured such that a transferring bias voltage which has polarity opposite to toner polarity is applied thereto by a power feeding portion (not shown). It is configured such that toner images of each of colors multiply-transferred on the intermediate transfer belt 34 are secondary transferred, by the secondary transfer roll 62, to the recording medium P conveyed along the conveying path 60.

Moreover, an auxiliary path 66 is provided, which extends from the left side surface of the first processing unit 10A so as to join the second turning part 60B of the conveying path 60. The recording medium P sent from another recording medium housing unit (not shown) adjacently located on a left side of the first processing unit 10A enter into the conveying path 60 through the auxiliary path 66.

Meanwhile, at the downstream side of the transferring position T on the conveying path 60 in the first processing unit 10A, plural conveying belts 70 are provided, as an example of a conveying section, which conveys the recording medium P transferred the toner images thereon to the second processing unit 10B. Moreover, a conveying belt 80 is provided, as an example of a conveying section, which conveys the recording medium P conveyed by the conveying belts 70 to the downstream side in the second processing unit 10B.

Each of the plurality of conveying belts 70 and the conveying belt 80 are circularly formed and wound on a pair of winding rolls 72. The pair of winding rolls 72 are respectively arranged at the upstream side and the downstream side of the recording medium P in the conveying direction. Due to one of the winding rolls 72 being rotary driven, the conveying belts 70 and the conveying belt 80 are circularly moved in one direction (clockwise direction in FIG. 1). At the downstream side of the conveying belt 80, a fixing unit 82 is provided which fixes the toner images transferred (image-formed) to the surface of the recording medium P to the recording medium P by heat and pressure.

The fixing unit 82 has a fixing belt 84 which is arranged at an upper side of the conveying path 60 (image forming surface side of the recording medium P), and a pressure roll 88 which is arranged so as to contact the fixing belt 84 from underneath sandwiching the conveying path 60. A fixing part N is formed for fixing the toner image to the recording medium P by pressing and heating between the fixing belt 84 and the pressure roll 88.

The fixing belt 84 is formed in a circular shape and is wound to a driving roll 89 and a driven roll 90 which are arranged one above the other. The driving roll 89 is opposed to the pressure roll 88 from above and, the driven roll 90 is arranged on the upper side of the driving roll 89. Moreover, a heating unit such as a halogen heater is embedded in the driving roll 89 and the driven roll 90 respectively. Due to this, the fixing belt 84 is heated.

At the downstream side of the fixing unit 82, a conveying belt 108 is provided, as an example of a conveying section, which conveys the recording medium P sent from the fixing unit 82 to the downstream side. The conveying belt 108 has a configuration similar to those of the conveying belts 70. Moreover, a cooling unit 110 is provided, which cools down the recording medium P heated by the fixing unit 82 at the downstream side of the conveying belt 108.

The cooling unit 110 is configured so as to include an absorbing device 112 which absorbs heat of the recording medium, and a pressing device 114 which presses the recording medium P to the absorbing device 112. The absorbing device 112 is arranged on one side of the conveying path 60 (upper side in FIG. 1), and the pressing device 114 is arranged on the other side (lower side in FIG. 1).

The absorbing device 112 has a circular absorbing belt 116 which is in contact with the recording medium P and absorbs the heat of the recording medium P. The absorbing belt 116 is wound to a driving roll 120 which transmits driving force to the absorbing belt 116 and plural winding rolls 118. Moreover, at an inner circumferential side of the absorbing belt 116, a heatsink 122 is provided which is made of an aluminum material and is in surface-contact with the absorbing belt 116 and releases heat absorbed by the absorbing belt 116. Further, at a reverse side of the second processing unit 10B (back side of the paper in FIG. 1), a fan 128 is provided for externally discharging hot air generated by the heat release of the heatsink 122.

The pressing device 114 has a circular pressing belt 130 as an example of conveying section which conveys the recording medium P while pressing the recording medium P to the absorbing belt 116. The pressing belt 130 is wound to plural winding rolls 132.

Moreover, at the downstream side of the cooling unit 110 on the conveying path 60, a correcting device 140 is provided, which sandwiches and conveys the recording medium P, and corrects a curvature (curling) of the recording medium P. At the downstream side of the correcting device 140 on the conveying path 60, an inline sensor 200 is provided, as an example of detecting apparatus, which detects toner density defect, image defect, image position defect of the toner image fixed to the recording medium P and, a position and shape and the like of the recording medium P. The inline sensor 200 will be described in detains in the followings.

At the downstream side of the inline sensor 200 on the conveying path 60, a discharging roll 198 is provided, which discharges the recording medium P on which the image is formed on one side to a discharging unit 196 attached to a side surface of the second processing unit 10B. Meanwhile, it is configured such that, in a case that images are formed both side of the recording medium P, the recording medium P sent from the inline sensor 200 is conveyed to an inversion path 194 provided at the downstream side of the inline sensor 200.

On the inversion path 194, a branching path 194A is provided which branches from the conveying path 60, a sheet conveying path 194B is provided which conveys the recording medium P conveyed along the branching path 194A toward the first processing unit 10A side, and an inversion path 194C is provided in which the recording medium P conveyed along the sheet conveying path 194B is turned over in the opposite direction to perform a switchback conveyance, thereby turning the medium upside-down. Due to this configuration, the recording medium P that switch-back conveyed by the inversion path 194C is conveyed toward the first processing unit 10A, and enters the conveying path 60 provided at an upper part of the recording medium housing unit 48 and is sent to the transfer position T again.

An image forming process of the image forming apparatus 10 will be explained in the followings.

As shown in FIG. 1, image data processed by the image signal processing unit 13 are sent to each of the exposure devices 40. Then, as shown in FIG. 2, each of the exposure devices 40 emits each light beam L according to the image data and exposes the outer surface of each photoreceptor 18 electrically charged by the scorotron charging device 20, and thus electrostatic latent images are formed. Furthermore, the electrostatic latent images formed on the photoreceptors 18 are developed by the developing device 22, and then toner images with respective colors of the first custom color (V), the second custom color (W), yellow (Y), magenta (M), cyan (C) and black (K) are formed.

Subsequently, as shown in FIG. 1, toner images of respective colors formed on the photoreceptors 18 (refer to FIG. 2) of the image forming units 16V, 16W, 16Y, 16M, 16C and 16K are multiply transferred to the intermediate transfer belt 34 sequentially, using six primary transfer rolls 36V, 36W, 36Y, 36M, 36C and 36K. Then the toner images of respective colors multiply-transferred to the intermediate transfer belt 34 are secondary transferred using the secondly transfer roll 62 onto the recording medium P conveyed from the recording medium housing unit 48. Furthermore, the recording medium P transferred the toner images thereon is conveyed by the conveying belt 70 to the fixing unit 82 which is equipped inside the second processing unit 10B.

Subsequently, the toner images of the respective colors on the recording medium P are fixed thereon at the fixing unit 82 by application of heat and pressure. Then, the recording medium P to which the toner images are fixed is cooled while passing through the cooling unit 110, after which the recording medium P is conveyed into the correcting device 140, and any curling that has occurred at the recording medium P is corrected. Further, the recording medium P with curling corrected is discharged to the discharging unit 196 by the discharging roll 198 after image defects or the like have been detected by the inline sensor 200.

On the other hand, when forming images on a non-image surface of the recording medium P on which images have not been formed (double-sided printing), the recording medium P is turned over at the inversion path 194 after passing through the inline sensor 200, and further is sent to the conveying path 60 provided above the recording medium housing unit 48. Thus, toner images are formed on the back side according to the process described above.

In addition, in the image forming apparatus 10 according to this exemplary embodiment, components for forming images of the first custom color and the second custom color (the image forming units 16V and 16W, the exposure devices 40V and 40W, the toner cartridges 14V and 14W, and the primary transfer rolls 36V and 36W) are configured such that these components can be attached to and removed from the first processing unit 10A as optional units by user's choice. Therefore, the image forming apparatus 10 may be configured in a form without having units for forming both the first custom color and the second custom color, and also may be configured in a form having only units for forming images of either one of the first custom color and the second custom color.

Next, the inline sensor 200 will be explained.

(Fundamental Configuration of the Inline Sensor 200)

Figure 3:
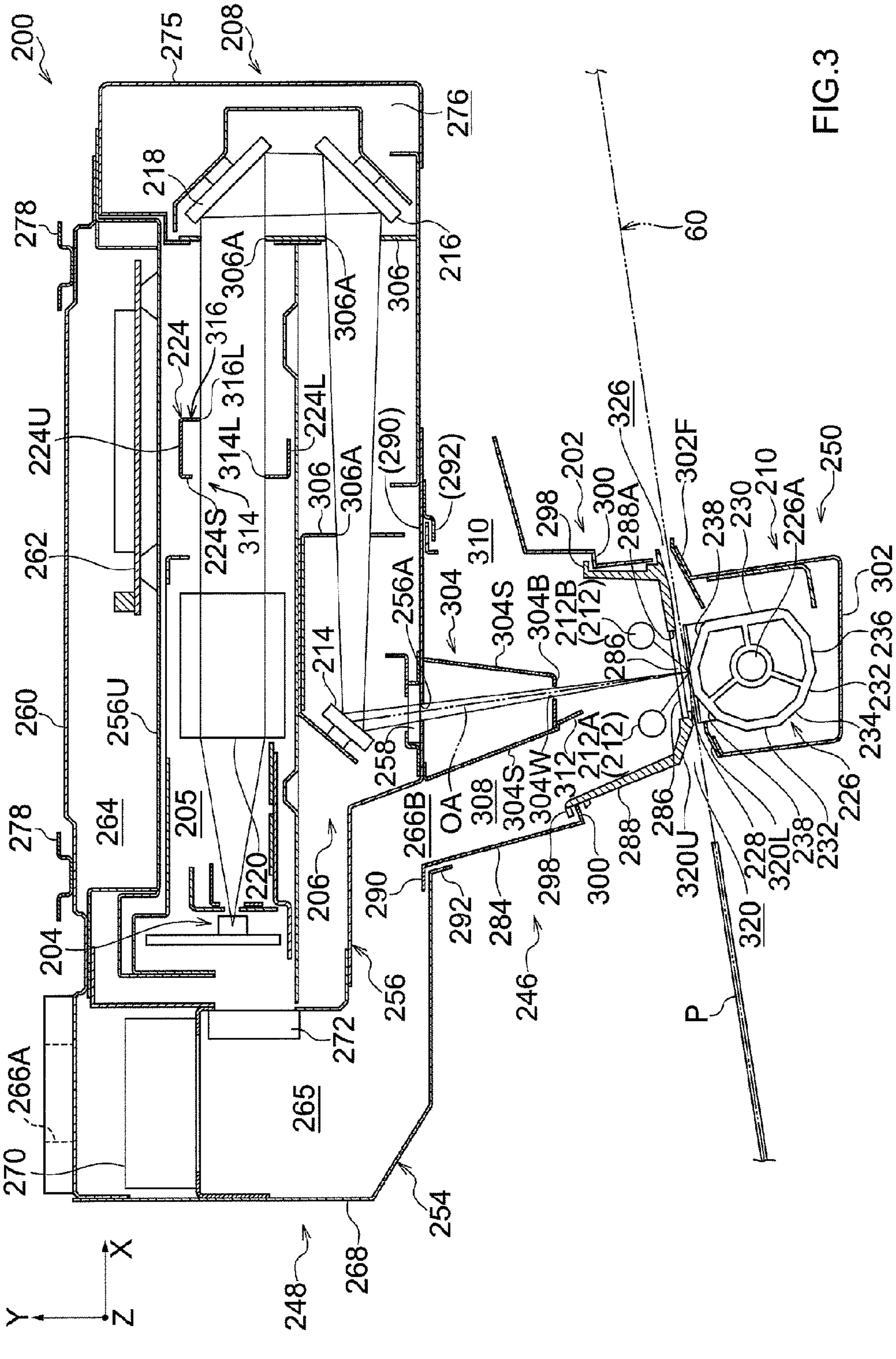
FIG. 3 is a schematic diagram of the inline sensor concerning the exemplary embodiment of the present invention.

As shown in FIG. 3, the inline sensor 200 is equipped with an illuminating unit 202 that emits light to the recording medium P having recorded the images, an imaging unit 208 having the imaging optical system 206 forming images on the CCD sensor 204 as an example of a light-receiving member receiving the light emitted from the illuminating unit 202 and reflected by the recording medium P, and a setting unit 210 where various criteria are set for the case that the inline sensor 200 is in use and for the case of calibration and the like. The CCD sensor 204 is configured to receive the light reflected by the recording medium P, and to detect images or the recording medium P according to the intensity of the light.

Here, the light from the recording medium P described herein includes the reflected light which has been reflected by the recording medium P and the transmitted light which has transmitted through the recording medium P, and in broader way, it is the light by which information concerning the images formed on the recording medium P, and positions or shapes of the recording medium P can be detected. Besides, the transmission described herein includes that the light passes through an imaging lens or the like, in addition to that the light passes through a window glass or the like. Furthermore, the detection of the recording medium P described herein includes detection of the position and the shape of the recording medium P.

The illuminating unit 202 is placed on the upper side of the conveying path 60 of the recording medium P and contains a pair of lamps 212 emitting the light toward the recording medium P. Each lamp 212 is a xenon lamp which is longitudinal in the Z direction. The length of the illumination range is larger than the largest width of the recording medium P to be carried. The pair of lamps 212 is placed symmetrically about the optical axis OA (design optical axis) of the light reflected by the recording medium P and traveling toward the imaging unit 208. More specifically, each of lamps 212 is placed symmetrically with respect to the optical axis OA such that respective illumination angle thereof to the recording medium P is between 45 degrees to 50 degrees.

In details, the pair of lamps 212 is equipped with a first lamp 212A provided at the upstream side in conveying direction of the recording medium P, and a second lamp 212B provided at the opposite side of the first lamp 212A across the optical axis OA. Here, a detector 207 is configured to include the CCD sensor 204, the lamps 212 and a window glass 286 as an example of a transmission member which will be described below. The images on the conveyed recording medium P is detected by the detecting unit 207.

The imaging optical system 206 is equipped, as main components thereof, with a first mirror 214 that reflects light guided along the optical axis OA in the X direction (in this exemplary embodiment, toward the downstream side in the conveying direction of the recording medium P), a second mirror 216 that reflects light reflected by the first mirror 214 upward, a third mirror 218 that reflects light reflected by the second mirror 216 to the upstream side in the conveying direction of the recording medium P, and lens 220 that focuses the light reflected by the third mirror 218 on the CCD sensor 204 (forming an image). The CCD sensor 204 is placed at the upstream side in the conveying direction of the recording medium P with respect to the optical axis OA.

The length of the first mirror 214 along the Z direction is formed to be larger than the maximum width of the recording medium P. Furthermore, the first mirror 214, the second mirror 216 and the third mirror 218 are configured to respectively reflect the light that is reflected by the recording medium P and has entered the imaging optical system 206, while narrowing down the light in the Z direction (main-scanning direction). This configuration allows incidence of the reflected light from each part in the width direction of the recording medium P onto the lens 220, which has a substantially cylindrical shape.

According to the configuration described above, in the inline sensor 200, the CCD sensor 204 is configured to output (feed back) signals in accordance with the light which has formed image, namely image density, toward the control device 192 (refer to FIG. 1) provided in the first processing unit 10A of the image forming apparatus 10. The control device 192 is configured to correct the image formed at the image forming unit 16 based on the signal from the inline sensor 200. Furthermore, in the image forming apparatus 10, the intensity of the illuminated light by the exposure device 40, an image forming position and the like are corrected based on the signal from the inline sensor 200, as an example.

A light amount aperture unit (diaphragm unit) 224 is provided between the third mirror 218 and the lens 220 in the imaging optical system 206. The light amount aperture unit 224 is configured to be able to narrow down (stop down) the amount of the light, which forms image on the CCD sensor 204 across an optical path in the Z direction, in the Y direction (the direction intersecting with the main-scanning direction), and to adjust the light amount to be stopped down by operation from outside. With respect to the light amount by the light amount aperture unit 224, it is configured such that the amount of the light forming images on the CCD sensor 204 is adjusted to be a predetermined value, even if the amount of luminescence by each lamp 212 is changed with time.

Meanwhile, the setting unit 210 has a reference roll 226 which is longitudinal in the Z direction. The reference roll 226 has a detection reference surface 228 which is directed to face the conveying path 60 side when performing image detection of the recording medium P, an evacuation surface 230 which is directed to face the conveying path 60 side when not performing the image detection of the recording medium P by the inline sensor 200, white reference surfaces 232, a color reference surface 234 on which a multi-color pattern is formed along the longitudinal direction, and a composite test surface 236 on which plural test patterns are formed. In this exemplary embodiment, the reference roll 226 is formed in a polygonal column shape on which eight or more surfaces are formed in a circumferential direction. The detection reference surface 228, the evacuation surface 230, the color reference surface 234 and the composite test surface 236 are each provided as only one surface, and the two white reference surfaces 232 are provided.

Moreover, the reference roll 226 is configured so that it switches the surface facing the conveying path 60 by being rotated about the rotation axis 226A. The switching of the surface of the reference roll 226 is achieved by the control circuit (not shown) provided in a circuit substrate 262 which will hereinafter be described. Further, due to the reference roll 226 being formed in the polygonal column shape with at least eight sides, the difference between the distance from the center in a circumferential direction of each surface and from the corner parts between the surfaces with respect to the center of rotation of the reference roll 226 is kept small. Therefore, while the distance between each surface of the reference roll 226 and the illuminating position of each lamp 212 (window glass 286 which will hereinafter be described) is made small, the corner parts between the surfaces of the reference roll 226 do not interfere with the illuminating unit 202.

With respect to the detection reference surface 228, the width thereof in a circumferential direction is smaller than that of the other surface, and is smaller than the width of the window glass 286 in the conveying direction of the recording medium P. The surfaces of both side in the circumferential direction is defined as guide surfaces 238 which do not have a function as each reference described above. Moreover, the detection reference surface 228 is defined as a position reference surface for positioning the surface to be detected (to be read) of the conveyed recording medium P to a illumination position by each lamp 212.

With respect to the evacuation surface 230, the width thereof in a circumferential direction is larger than that of the other surfaces. When not performing image detection of the recording medium P with the inline sensor 200, the evacuation surface 230 is a guide surface which guides the recording medium P, and a distance between the evacuation surface 230 and an axial center of the rotation axis 226A is smaller than in the case of the detection reference surface 228. Accordingly, when not performing image detection of the recording medium P with the inline sensor 200, a conveying path is formed which has a wider space between the illuminating unit 202 (the window glass 286) and the evacuation surface 230 than when performing image detection of the recording medium P with the inline sensor 200.

The white reference surfaces 232 are for calibration of the imaging optical system 206, and are configured with a reference white film attached thereto, for outputting a predetermined signal from the imaging optical system 206. The color reference surface 234 is for calibration of the imaging optical system 206, and is configured with a film attached thereto that is applied with patterns of reference colors corresponding to the respective colors.

Figure 6:
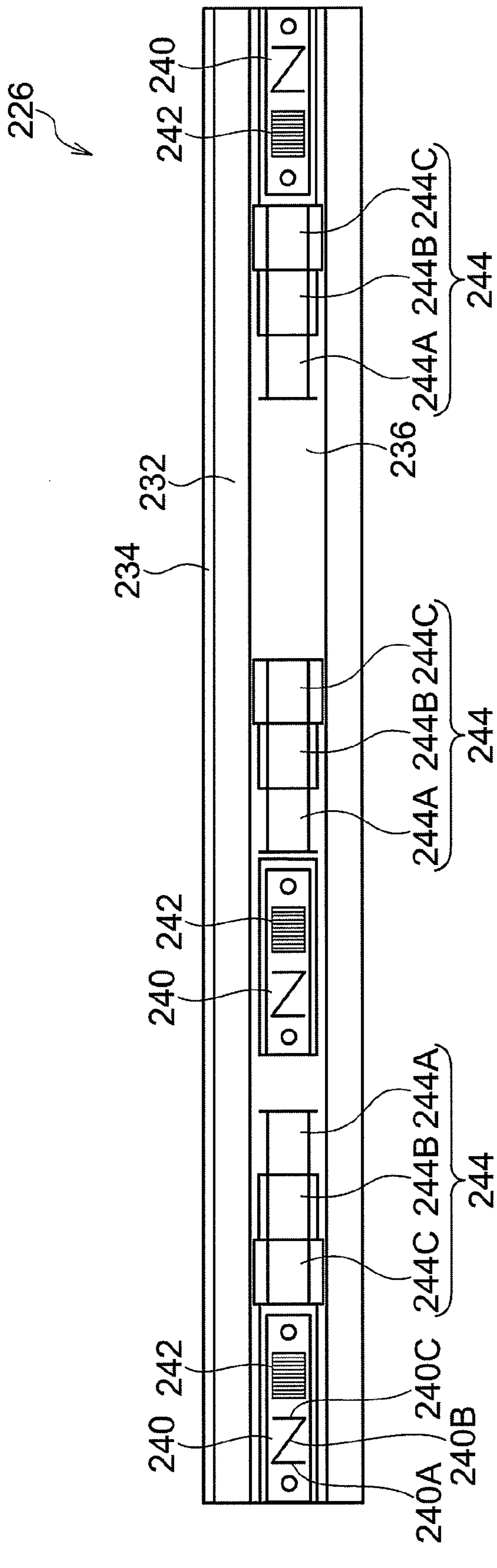
FIG. 6 is a schematic diagram of the composite test surface concerning the exemplary embodiment of the present invention.

As shown in FIG. 6, the composite test surface 236 is formed so that a position alignment pattern 240 for calibrating the position of the reference roll 226 in a rotation direction (conveying direction of the recording medium P), a focus detecting pattern 242, and a depth detecting pattern 244 are arranged in a same surface.

The position alignment pattern 240 is configured with a white background film attached thereto, on which a black N-shaped pattern is formed so that the vertical line of the N is along the conveying direction of the recording medium P. The focus detecting pattern 242 is configured with a white background film attached thereto, on which a ladder pattern is formed, the ladder pattern being like a pattern having a number of black straight lines in parallel along the conveying direction of the recording medium P.

The depth detecting pattern 244 is configured with a pattern in which three white surfaces 244A, 244B and 244C to which distances from the rotation axis 226A (refer to FIG. 2) of the reference roll 226 are different are arranged in a staircase pattern in a longitudinal direction of the composite test surface 236, and is formed by attaching a sheet member on which the patterns is formed.

Here, at least one position alignment pattern 240 is provided on each end in the longitudinal direction of the composite test surface 236. The focus detecting pattern 242 is arranged adjacent to a center side in the longitudinal direction of the composite test surface 236 with respect to the position alignment pattern 240 provided on each end. A total of three depth detecting patterns 244 are provided on each end side in the longitudinal direction of the composite test surface 236 and a center part. Further, in this exemplary embodiment, one position alignment pattern 240 and one focus detecting pattern 242 are arranged between the depth detecting patterns 244 arranged at the center and the depth detecting pattern 244 arranged at one end in the longitudinal direction.

Next, a procedure of the calibration of the CCD sensor 204 will be described.

In FIG. 3, first, the white reference surface 232 is directed to face the conveying path 60 of the recording medium P. Then, the CCD sensor 204 outputs a shading compensation signal for compensating distribution of light amount in the Z direction (main-scanning direction). Subsequently, the composite test surface 236 is directed to face the conveying path 60 of the recording medium P, and a detecting position in the conveying direction of the recording medium P by the CCD sensor 204 is automatically adjusted due to the position alignment pattern 240 (refer to FIG. 6). That is, by detecting the N-shaped pattern across in the Z direction (main-scanning direction), the diagonal part 240B between the two straight line parts 240A, 240C is detected as shown in FIG. 6. Then, the reference roll 226 is rotated so that a distance between the straight line part 240A and the diagonal part 240B equals to a distance between the straight line part 240C and the diagonal part 240B, and the detecting position is adjusted.

Subsequently, after the detecting position in the conveying direction of the recording medium P is adjusted, a focal point of the CCD sensor 204 is confirmed due to the focus detecting pattern 242 (refer to FIG. 6), and an illumination depth is confirmed due to the depth detecting pattern 244. Further, the color reference surface 234 is directed to face the conveying path 60 of the recording medium P. Then, the CCD sensor 204 is automatically adjusted so that signals of predetermined intensities are output for each of colors.

As described above, the calibration of the CCD sensor 204 is performed when the image forming apparatus 10 is powered on (about once a day), for example. Further, the calibration of the image forming apparatus 10 based on signals from the CCD sensor 204 is performed, for example, each time a job is finished in which at least a predetermined number of images is formed on the recording medium P (about ten times a day).

(Divided Configuration of the Inline Sensor 200)

As shown in FIG. 3, the inline sensor 200 described above is configured so as to be dividable into three parts: a center unit 246, of which the main component is the illuminating unit 202; an upper unit 248, of which the main component is the imaging unit 208; and a lower unit 250, of which the main component is the setting unit 210.

The upper unit 248 is configured to be attachable to and detachable from the second processing unit 10B (refer to FIG. 1) of the image forming apparatus 10 by sliding in the Z direction. The center unit 246 is configured to be attachable to and detachable from the upper unit 248 by sliding in the Z direction. The lower unit 250 is configured to be attachable to and detachable from the center unit 246 and the upper unit 248 by sliding in the Z direction. The lower unit 250 which is located below the conveying path 60 of the recording medium P is supported by a lower side drawer (not shown) which is drawn toward the front side in the Z direction from the second processing unit 10B in order to relieve jamming of the recording medium P. The lower unit 250 is detached from and attached to the center unit 246 and the upper unit 248 by taking this lower side drawer in and out. Each configuration will be described in detail below.

(Configuration of the Upper Unit 248)

The upper unit 248 has an upper housing 254. The upper housing 254 houses the imaging unit 208 and a circuit substrate 262 described below, and configures a cooling duct 265 or the like. The upper housing 254 is configured so as to include the imaging system housing 256 which houses the CCD sensor 204 and the imaging optical system 206.

The imaging system housing 256 is formed nearly rectangle box shape and longitudinal in the X direction when viewed from the Z direction, and houses the CCD sensor 204 at one end part in the X direction (in this exemplary embodiment, an end part of the upstream side in the conveying direction of the recording medium P). Moreover, a second mirror 216 and a third mirror 218 are arranged at the other part of the imaging system housing 256 in the X direction. At nearly center part in the X direction of the imaging system housing 256, a window portion 256A on which light is incident along an optical axis OA is formed. The imaging system housing 256 is provided with the optics chamber 205, which houses the CCD sensor 204 or the like and, inside of which is made sealed (airtight) space due to closing the window portion 256A by light transmissive window glass 258.

Moreover, the upper housing 254 has an upper cover 260 which covers the imaging system housing 256 from the upper side. As a result, a substrate chamber 264 is formed in which a circuit substrate 262 is housed between the upper cover 260 and an upper wall 256U of the imaging system housing 256. Moreover, the upper housing 254 has a duct cover 268 which forms a duct 265 outside one end part in the X direction of the imaging system housing 256 where the CCD sensor 204 is located. The duct cover 268 covers the one end part of the imaging system housing 256 from the upstream side and the downstream side in the conveying direction of the recording medium P, and forms the duct 265 which is L-shaped in X-Y cross-section.

Figure 4:
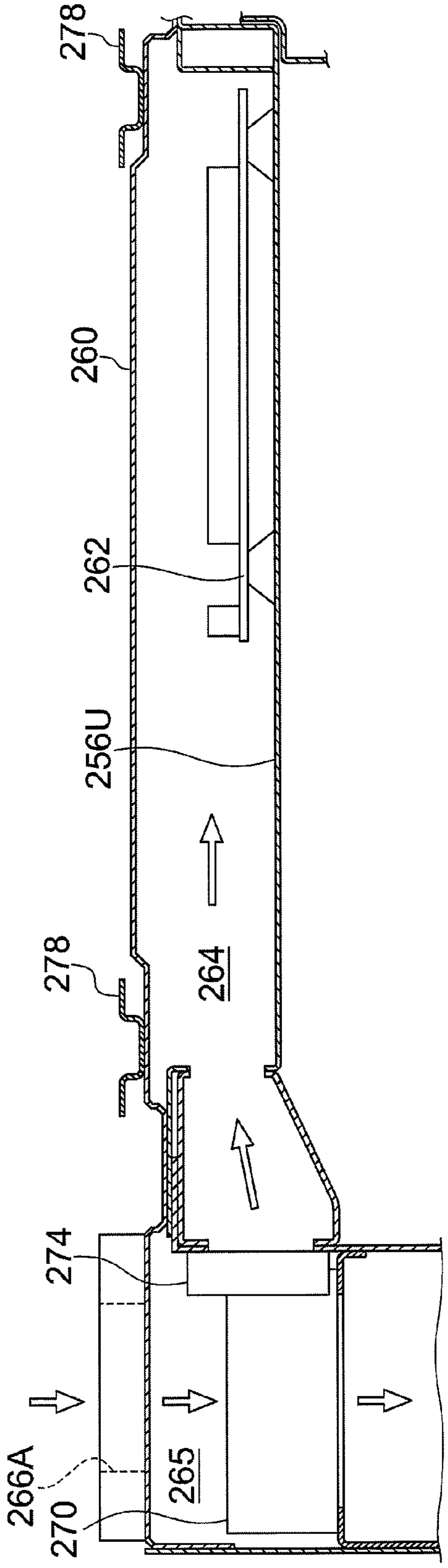
FIG. 4 is an explanatory diagram showing the state of sending air into the substrate chamber concerning the exemplary embodiment of the present invention.

The upper end of the duct 265 is regarded as an air inlet 266A, and the end part opposed to the air inlet 266A of the duct 265 is regarded as a connecting port 266B to connect the duct 308 of a lamp housing 284 which is described below. In the duct 265, it is located a fan 270 which causes airflow in the duct 265 from the upper side to the lower side. Moreover, in the duct 265, it is located a fan 272 which takes air into the optics chamber 205 (causes the inside of the optics chamber 205 to be positive pressure) provided in the imaging system housing 256. Further, in the duct 265, it is located a fan 274 (refer to FIG. 4) which takes air into the substrate chamber 264.

Furthermore, the upper housing 254 has a cover 275 which covers the imaging system housing 256 from the second mirror 216 side and the third mirror 218 side. An insulating space 276 is formed between the imaging system housing 256 and the cover 275. In the upper housing 254, sliders 278 are provided which are elongate in the Z direction. In this exemplary embodiment, a pair of sliders 278 is provided in parallel in the X arrow direction on the upper cover 260. Each of the sliders 278 can be fitted to a rail provided on the frame (not shown) of the second processing unit 10B. As a result, each of the sliders 278 moves while being guided by the rail, such that the upper unit 248 is moved in the Z direction with respect to the second processing unit 10B.

(Configuration of the Center Unit 246)

As shown in FIG. 3, the center unit 246 has a lamp housing 284 which houses the pair of lamps 212, a window glass 286 through which the light illuminated from the lamps 212 toward the recording medium P is penetrated, and a window cover 288 which holds the window glass 286. The window glass 286 is located between the conveying path 60 of the recording medium P and the lamps 212, and provided facing the conveying path 60. Moreover, the lamp housing 284 is formed in box shape which opens top and bottom thereof, the opening end of the upper side thereof being closed by the upper housing 254 and the opening end of the lower side thereof being closed by the window cover 288.

The illuminating unit 202 is configured such that the light emitted by each lamp 212 is illuminated to the recording medium P through the window glass 286, and the light reflected on the recording medium P is incident into the lamp housing 284 through the window glass 286 along the optical axis OA. It is configured such that the reflected light which is from the recording medium P and incident into the lamp housing 284 is led to the imaging unit 208 through the window glass 258 of the imaging system housing 256 which configures the imaging unit 208.

The lamp housing 284 has a pair of sliders 290 which project in the X arrow direction in a flange shape from an opening edge at the upper side, and which are elongate in the Z direction. The sliders 290 are fitted to the rail 292 formed on the upper housing 254. This allows each slider 290 to move while being guided by the rail 292 such that the lamp housing 284 is attached to and detached from the upper housing 254 (the upper unit 248) in the Z direction.

The window cover 288 is configured such that the edge thereof and the edge of the window glass 286 do not face the upstream side in conveying direction of the recording medium P. The window glass 286 is pressed against the window cover 288 at both ends in a longitudinal direction by attachment springs (not shown), in a closed posture of the window part 288A formed on the window cover 288. That is, the window glass 286 is configured so as to allow it to be attached to and detached from the window cover 288.

Moreover, the window cover 288 is configured so as to allow it to be attached to and detached from the lamp housing 284. Specifically, the window cover 288 is configured so that its cross-sectional shape taken along X-Y is a U-shaped form which opens at an upper side, and is provided with a pair of sliders 298 at the opening edge part. The sliders 298 are fitted to the rail 300 formed on the lamp housing 284. This allows each slider 298 to move while being guided by the rail 300 such that the window cover 288 is attached to and detached from the window glass 286 in the Z direction. As a result, in the inline sensor 200, it is possible to exchange and clean the window cover 288 with a single part.

While not illustrated in the drawings, the center unit 246 and the upper unit 248 are configured so as to be positioned with a high degree of accuracy in each of the X, Y and Z directions, by holes and pins to be inserted and removed according to relative movement in the Z direction. Moreover, the upper unit 248 and the casing of the second processing unit 10B (refer to FIG. 1) are configured so as to be positioned with a high degree of accuracy in each of directions of X, Y and Z, by holes and pins to be inserted and removed according to relative movement in the Z direction.

(Configuration of the Lower Unit 250)

As shown in FIG. 3, the lower unit 250 has a lower housing 302 which houses the reference roll 226 and a motor (not shown) driving the reference roll 226. The lower housing 302 is supported by a lower side drawer as described above, and is positioned in the Z direction by the lower side drawer. Moreover, the lower unit 250 and the center unit 246, the upper unit 248 are configured so as to be positioned with a high degree of accuracy in each of directions of X and Y, by holes and pins to be inserted and removed according to relative movement in the Z direction. Due to this configuration, the position of the lower unit 250 in each of directions of X, Y and Z with respect to the center unit 246 and the upper unit 248 is determined, the conveying path 60 of the recording medium P being located between the center unit 246 and the lower unit 250.

(Countermeasure Against Stray Light)

As shown in FIG. 3, in the lamp housing 284, a baffle 304 is provided so that the optical axis OA is surrounded in the upper part of the pair of lamps 212 (212A, 212B). As shown in FIG. 3, the baffle 304 is configured so as to have a pair of sidewalls 304S and the bottom wall 304B at least. In this exemplary embodiment, the pair of sidewalls 304S are connected with a pair of front and back walls (not shown) which are opposed in the Z direction. Moreover, it is formed a lower side window 304W into which an optical axis OA enters in the bottom wall 304B. The upper opening end of the baffle 304 surrounds the window part 256A of the imaging system housing 256. Therefore, the light which travels along optical axis OA enters into the imaging unit 208 via the inside of the baffle 304.

With respect to the baffle 304, the dimensions and shape thereof are set so that light emitted from the back side of each lamp 212 may not reach the window portion 256A. That is, with respect to the lower side window 304W, the position of the opening edge is set so that light emitted from the back side of each lamp 212 may not reach the window portion 256A directly. Moreover, with respect to the side wall 304S, the angle of inclination with respect to the optical axis is set so that light emitted from the back side of each lamp 212 does not reach the window portion 256A even if the light is reflected once.

On the other hand, in the imaging system housing 256, plural partition walls 306 are provided, which divide a part other than a optical waveguide by the imaging optical system 206. Each partition wall 306 has an aperture 306A, the size (upper limit) of an light transit portion being decided in so far as not narrowing down (stopping down) the diffusion light reflected by the recording medium P in the Y direction and the Z direction, according to the diffusion angle of the light reflected by the recording medium P.

(Airflow)

As shown in FIG. 3, in the lamp housing 284, the duct 308 is formed by one of the side walls 304S thereof (in this exemplary embodiment, the upstream side in the conveying direction of the recording medium P), and the peripheral wall of the lamp housing 284. The upper opening end of the duct 308 is connected to the duct 265 through the connection port 266B in a state where the lamp housing 284 is fit to the upper housing 254. Due to this structure, the airflow in the lamp housing 284 is generated by an operation of the fan 270.

An air outlet 310 is formed at a part which is positioned at an opposite side to the duct 308 side in the X direction of the peripheral wall of the lamp housing 284. Therefore, the airflow from the duct 265 flows through the first lamp 212A at the upstream side in the conveying direction of the recording medium P and the second lamp 212 B at the downstream side thereof while being guided by the peripheral wall of the lamp housing 284 and the window cover 288, and is discharged outside of the lamp housing 284 through the air outlet 310.

Moreover, an overhang portion 312 for suppressing that the light emitted from the back side of the first lamp 212A reaches the lower side window 304W is projected from the lower end of the sidewall 304S which configures the duct 308. The projection amount of the overhang portion 312 is set so that the cooling effect of the pair of lamps 212 by the airflow to the pair of lamps 212 becomes equivalent.

(Light Amount Aperture Unit)

As shown in FIG. 3, the light amount aperture unit 224 has a sidewall 224S, an upper wall 224U and a lower wall 224L, and the cross-section shape taken along X-Y thereof is U-shaped form which opens toward the third mirror 218 side. A substantially rectangle shaped opening part 314 is formed in the sidewall 224S of the light amount aperture unit 224. Moreover, a rib 316 is drooped from a free end part of the upper wall 224U. Thereby, the light amount aperture unit 224 is configured so as to cut the light from the recording medium P at a lower edge 314L of the opening part 314 and at a lower end 316L of the rib 316 and to narrow down the light amount in the Y direction.

One end in the longitudinal direction of the light amount aperture unit 224 reaches a wall at the front side of the imaging system housing 256, and an adjusting lever (not shown) is attached to the one end in the longitudinal direction of the light amount aperture unit 224 through an operation hole formed in the wall. The light amount aperture unit 224 is configured so as to rotate in accordance with operation of the adjusting lever and to move from an initial position in which the light amount is most narrowed down to postures in which the amount of narrowing down is gradually decreased.

(Jamming Suppression Structure)

Figure 5:
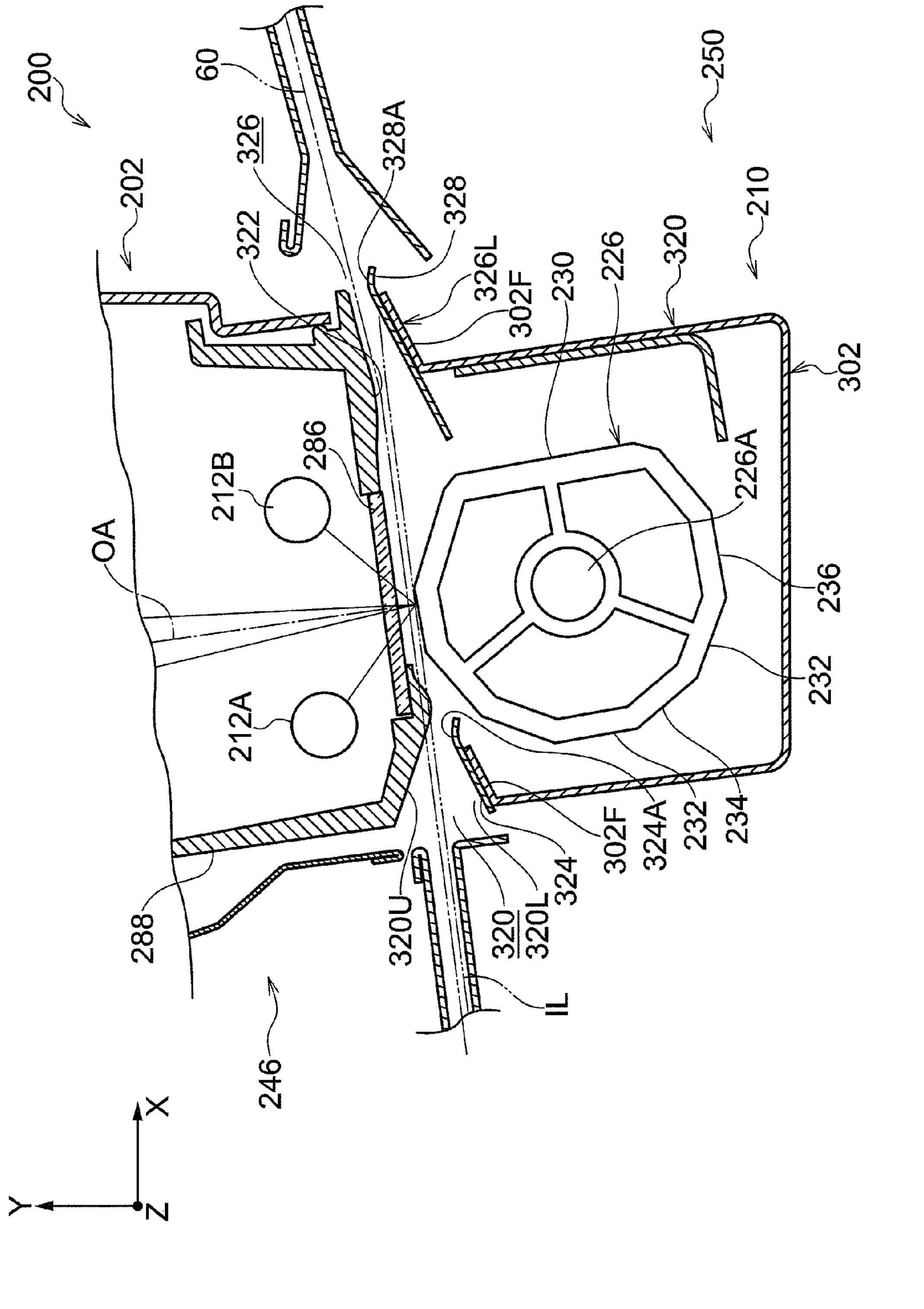
FIG. 5 is a cross-sectional view which magnified the conveying path part of the recording medium in the inline sensor concerning the exemplary embodiment of the present invention.

As shown in FIG. 5, the conveying path 60 between the center unit 246 (the illuminating unit 202) and the lower unit 250 (the setting unit 210) is configured such that the position thereof becomes higher toward the downstream side in the conveying direction of the recording medium P. For each corner part of the first window cover 288 and the lower housing 302, a chamfering or a rounding processing is carried out. Thereby, an entrance chute 320 which is an inducing part facing the upstream side in the conveying direction of the recording medium P is formed at a position upstream side from the window glass 286 in the inline sensor 200.

The upper chute 320U which structures the upper part of the entrance chute 320 is configured with a smooth curved surface which is downwardly convex. Here, if it assumes the extension line of the detection reference surface 228 as IL, when viewed from the Z direction in a state in which the detection reference surface 228 of the reference roll 226 faces to the conveying path 60 side of the recording medium P, the dimension and shape of the upper chute 320U is set so as to interfere with the extension line IL (so that a projected end of the upper chute 320U is positioned lower side of the extension line IL).

The lower chute 320L which configures the lower part of the entrance chute 320 is close to the reference roll 226 by a lower chute member 324 fixed to a flange 302F which is extended inward from the opening end of the lower housing 302. Further, the downstream end in the conveying direction of the recording medium P in the lower chute member 324 is configured as a round part 324A rounded so as to become a convex upward.

An exit chute 326 is formed between a downstream side part in the conveying direction of the recording medium P in the convex part 322, and the lower housing 302. The lower chute 326L which forms the lower part of the exit chute 326 is configured by fixing a lower chute member 328 to the flange 302F which is extended outward from the opening end of the lower housing 302. Further, the downstream end in the conveying direction of the recording medium P in the lower chute member 324 is configured as a round part 328A that is upwardly convex.

Moreover, when detecting the image by the CCD sensor 204, the detection reference surface 228 of the reference roll 226 is configured so as to be directed to face the recording medium P side with the posture nearly parallel to the window glass 286. Each guide surface 238 provided in the both sides of this detection reference surface 228 receives the recording medium P from the entrance chute 320, and guides the recording medium P toward the exit chute 326.

On the other hand, when not detecting the image with the CCD sensor 204, the evacuation surface 230 of the reference roll 226 is directed to face the recording medium P side in a posture (un-parallel posture) in which the evacuation surface 230 becomes closer to the window glass 286 the further downstream it extends in the conveying direction of the recording medium P. Moreover, the evacuation surface 230 is configured as a wide surface which extends from the round part 324A of the lower chute member 324 to the vicinity of the exit chute 326. The evacuation surface 230 receives the recording medium P from the entrance chute 320 in the above-mentioned posture, and guides the recording medium P toward the exit chute 326.

(Function of the Inline Sensor 200)

As shown in FIG. 3, the inline sensor 200 illuminates the recording medium P which passes through between the illuminating unit 202 and the setting unit 210 with light by the pair of lamps 212. Then, the light reflected by the recording medium P is led to the imaging unit 208 along the optical axis OA, and is imaged on the CCD sensor 204 by the imaging optical system 206 of the imaging unit 208. Subsequently, the CCD sensor 204 outputs the signal according to an image density for every position of the image to the control device 192 (refer to FIG. 1) of the image forming apparatus 10. Then, in the control device 192, the image density and an image forming position or the like are corrected based on the signal from the CCD sensor 204.

On the other hand, when performing the calibration of the CCD sensor 204 which configures the inline sensor 200, first, the motor of the lower unit 250 operates and the white reference surface 232 is directed to face the conveying path 60 of the recording medium P. Then, the CCD sensor 204 is adjusted so as to output a predetermined signal.

Subsequently, composite test surface 236 (refer to FIG. 6) is directed to face the conveying path 60 of the recording medium P, and the detection position of the CCD sensor 204 is adjusted so that an interval between a diagonal part 240B and a straight line part 240A, and an interval between the diagonal part 240B and a straight line part 240C, of a position alignment pattern 240 (refer to FIG. 6) become equal. Next, the focus state of the CCD sensor 204 is checked using the focus detecting pattern 242. Moreover, the illumination depth is checked using the depth detecting pattern 244. Furthermore, the color reference surface 234 (refer to FIG. 6) is directed to face the conveying path 60 of the recording medium P. For each color, the CCD sensor 204 is adjusted so as to output the predetermined signal.

(Configuration of the Main Part)

Next, details of the detecting unit 207 of the inline sensor 200 and the reference roll 226 will be explained.

Figure 7A:
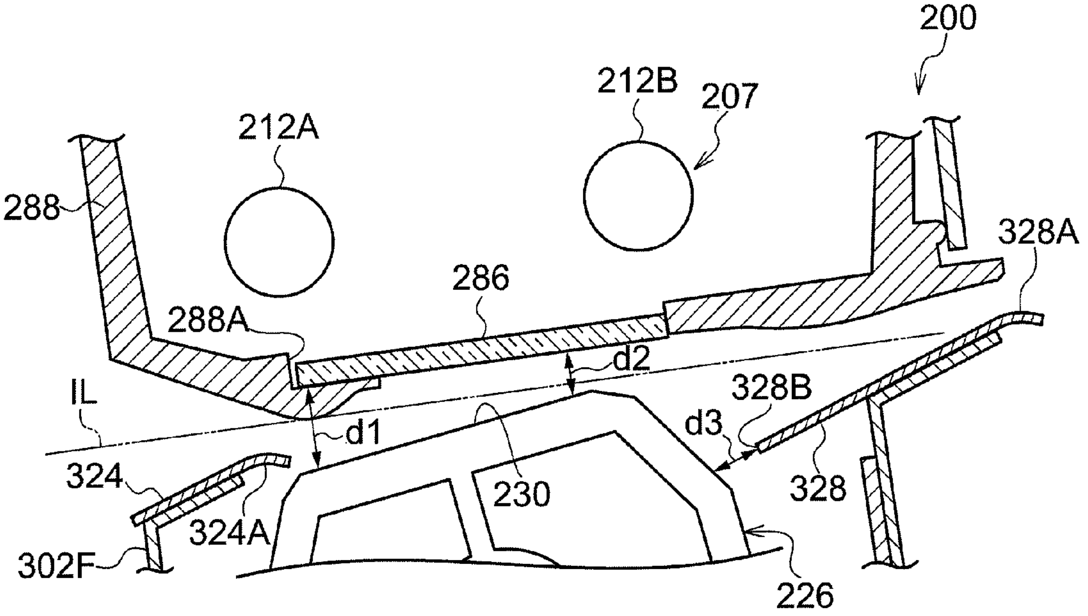
FIG. 7A is a cross-sectional view showing a position relationship of a detecting surface and a evacuation surface concerning the exemplary embodiment of the present invention.

As shown in FIG. 7A, the detecting unit 207 of the inline sensor 200 has the window cover 288 for supporting the window glass 286, and the exposed part to the image side of the recording medium P (not shown in FIG. 7A) in the lower surface of the window glass 286 is made as a detecting surface 286A as an example.

On the other hand, in the inline sensor 200, the reference roll 226 as an example of an opposing member having plural surfaces in the conveying direction of the recording medium P is provided at the opposite side of the detecting surface 286A so as to face it, across the conveying path 60 (refer to FIG. 3) of the recording medium P.

The reference roll 226 has the evacuation surface 230, which is an example of a first opposing surface which is one surface among the plural surfaces, and the evacuation surface 230 is located opposite the detecting surface 286A. Moreover, the opposing surface is changed by rotating the reference roll 226 so that the detecting surface 286A and the detection reference surface 228 (refer to FIG. 3), which is an example of a second opposing surface are disposed opposite to each other when performing image detection of the recording medium P using the detecting unit 207 (at the time of detection), and the detecting surface 286A and the evacuation surface 230 are disposed opposite to each other when not performing image detection (at the time of non-detection).

Here, when a distance (spacing) between a part (an end portion) at the upstream side in the conveying direction of the recording medium P and the detecting surface 286A is defined as d1, and a distance (spacing) between a part (an end portion) at the downstream side and the detecting surface 286A is defined as d2, the evacuation surface 230 is inclined so as to satisfy d1>d2. That is, in the evacuation surface 230, the downstream side thereof in the conveying direction is closer to the detection surface 286A than the upstream side thereof in the conveying direction. Moreover, the evacuation surface 230, as a whole, is positioned at a side further separated from the detection surface 286A than the extension line IL of the detection reference surface 228 (refer to FIG. 3).

Figure 7B:
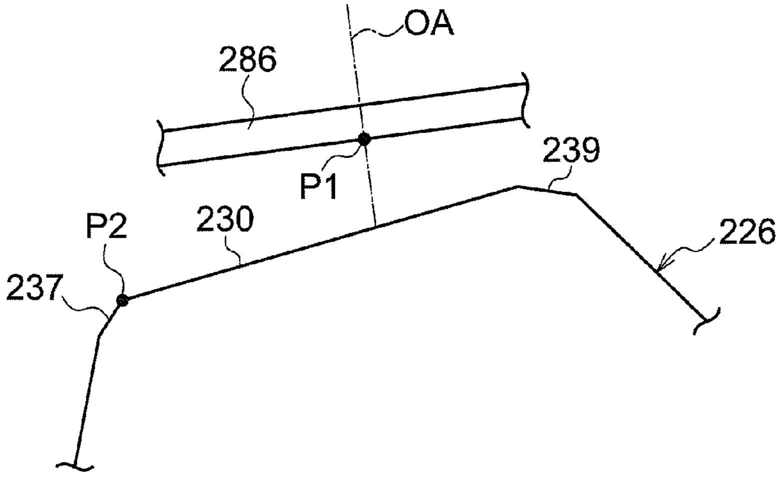
FIG. 7B is an exemplary diagram showing the outer shape of the reference roll concerning the exemplary embodiment of the present invention.

Moreover, as shown in FIG. 7B, in the reference roll 226, the end portion 237 at the upstream side of the evacuation surface 230 and the end portion 239 at the downstream side thereof are configured to be a round shape, as an example of a curved shape, which is convex outward. The read position P1 for reading the image information of the recording medium P is set on the detecting surface 286A, and a position P2 of the end portion at the upstream side of the evacuation surface 230 in the reference roll 226 is positioned at the upstream side of the read position P1 of the detecting surface 286A in the conveying direction. The read position P1 is a position at which the optical axis OA intersects with the detecting surface 286A when viewing the window glass 286 from a direction perpendicular to the conveying direction.

On the other hand, as shown in FIG. 7A, the lower chute member 328 as an example of a guide member for guiding the recording medium P to the downstream side, is provided at the downstream side of the detecting surface 286A in the conveying direction and at the downstream side of the reference roll 226, as described above. With respect to the lower chute member 328, an end portion thereof at the downstream side in the conveying direction is configured as a round part 328A as an example of a curved shape which is curved toward a direction away from the recording medium P. Moreover, a gap d3 is formed between the end surface 328B at the upstream side of the lower chute member 328 and the reference roll 226, so that the reference roll 226 does not contact the lower chute member 328 at the time of rotation for changing the plural surfaces.

Next, the operation of the present exemplary embodiment will be explained.

Figure 8A:
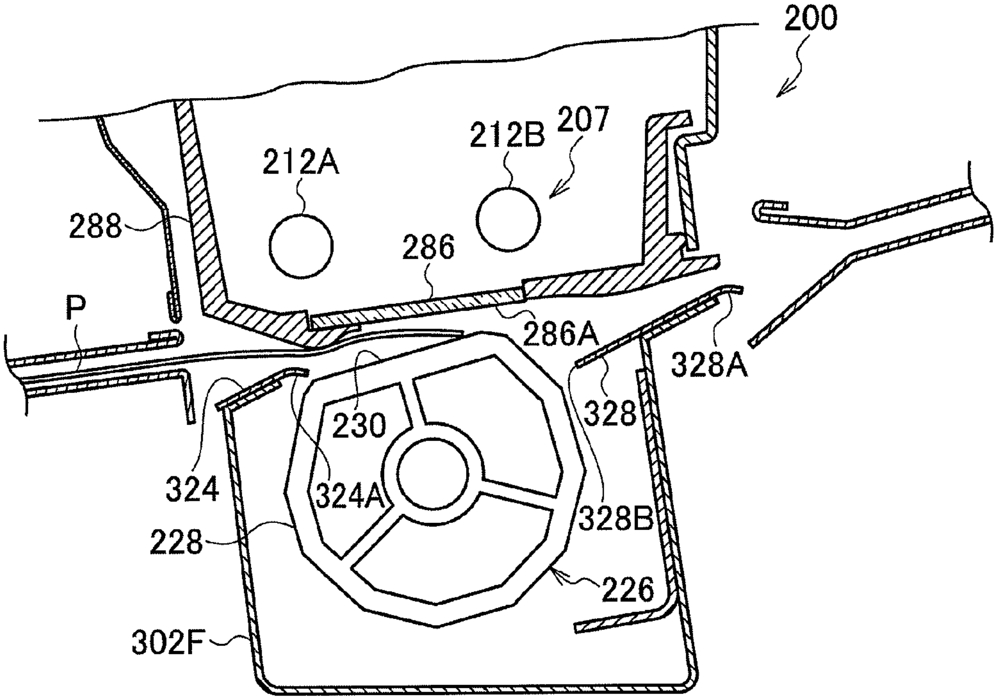
FIG. 8A and FIG. 8B are explanatory diagrams showing the state where the recording medium P with downward curling is conveyed in the inline sensor concerning the exemplary embodiment of the present invention.

First of all, as shown in FIG. 8A, it will be explained a case that the front part of the recording medium P conveyed to the inline sensor 200 is curled in a convex shape (a shape in which the front part is curved obliquely downward toward the conveying direction) when viewed from a direction perpendicular to the conveying direction.

The recording medium P conveyed to the inline sensor 200 contacts the lower chute member 324 at the upstream side and moves upward, since the front part thereof is inclined downward. At this time, since the end portion at the downstream side of the lower chute member 324 is configured as the round part 324A, the end surface of the lower chute member 324 does not contact the recording medium P, whereby the occurrence of scratching of the recording medium P is suppressed.

Subsequently, the front part of the recording medium P moved downstream in the conveying direction from the position of the lower chute member 324 contacts an upstream side part of the evacuation surface 230, and is gradually guided obliquely upward along the evacuation surface 230. That is, the front end part of the recording medium P is gradually pressed upward to the detecting surface 286A side. Then, the front end part of the recording medium P is conveyed at a position that is separated from the end surface 328B at the upstream side of the lower chute member 328 on the downstream side.

Figure 8B:
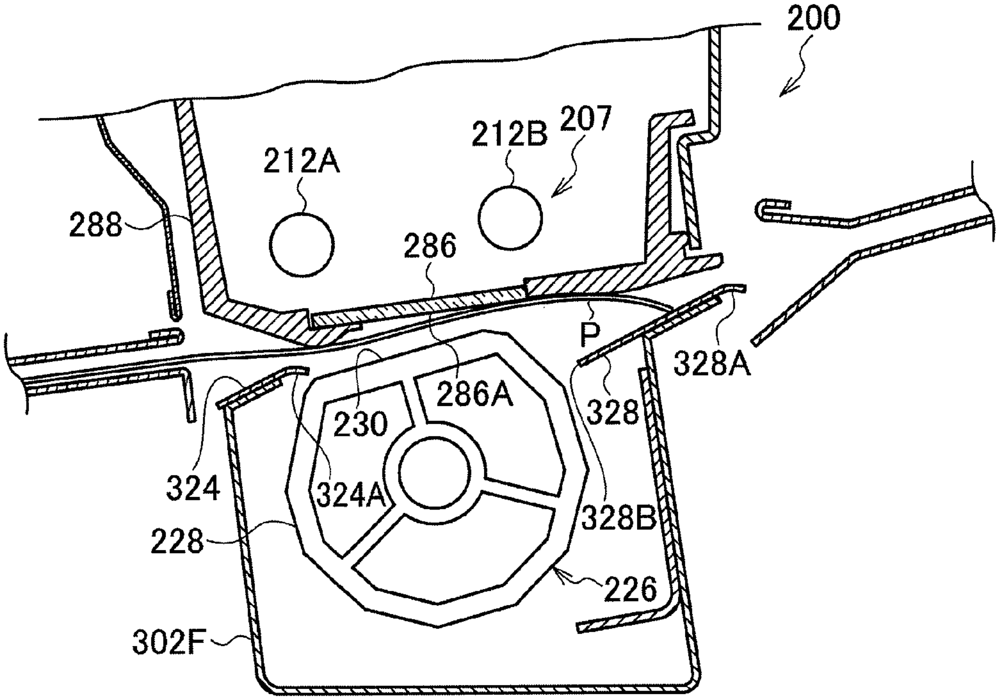

As a result, as shown in FIG. 8B, even if the front end part of the recording medium P, which has passed the reference roll 226, is bent downward by its own weight, a contact position thereof with the lower chute member 328 is at the downstream side of the end surface 328B, whereby the recording medium P is prevented from entering the gap d3 between the reference roll 226 and the lower chute member 328. Moreover, since the end portion at the downstream side of the lower chute member 328 is formed as the round part 328A, there is no contact between the end surface of the lower chute member 324 and the recording medium P, and the occurrence of scratching of the recording medium P is suppressed.

Further, in the inline sensor 200, since the end portion 237 at the upstream side of the evacuation surface 230 and the end portion 239 at the downstream side thereof (refer to FIG. 7B) are formed in a curved shape in the reference roll 226, the occurrence of scratching of the recording medium P is suppressed in comparison with a configuration in which both end parts are linearly angled. Moreover, since the evacuation surface 230 is disposed at a side that is further from the detection surface 286A than the extension line IL of the detection reference surface 228, the space between the detecting surface 286A and the reference roll 226 is broadened, and the resistance force which acts on the recording medium P by contact with the reference roll 226 is weakened. Thereby, conveyance of the recording medium P is performed properly.

In addition, in the inline sensor 200, as shown in FIG. 7B, since the position P2 of the end portion at the upstream side of the evacuation surface 230 is positioned at the upstream side of the read position P1 of the detecting surface 286A in the conveying direction, the recording medium P is spaced apart from the detecting surface 286A at a region at the upstream side of the read position P1 of the detecting surface 286A. As a result, conveying resistance against the recording medium P caused by contact of the reference roll 226 with the recording medium P decreases. Moreover, in the inline sensor 200, since the evacuation surface 230 is located so as to face the detecting surface 286A when not detecting the image on the recording medium P, it is possible to reduce a contact area between the opposing member and the recording medium, in comparison with a configuration in which distances from the detecting surface 286A to the end portion at the upstream side of the opposing surface and the end portion at downstream side thereof in the conveying direction are identical.

Figure 9:
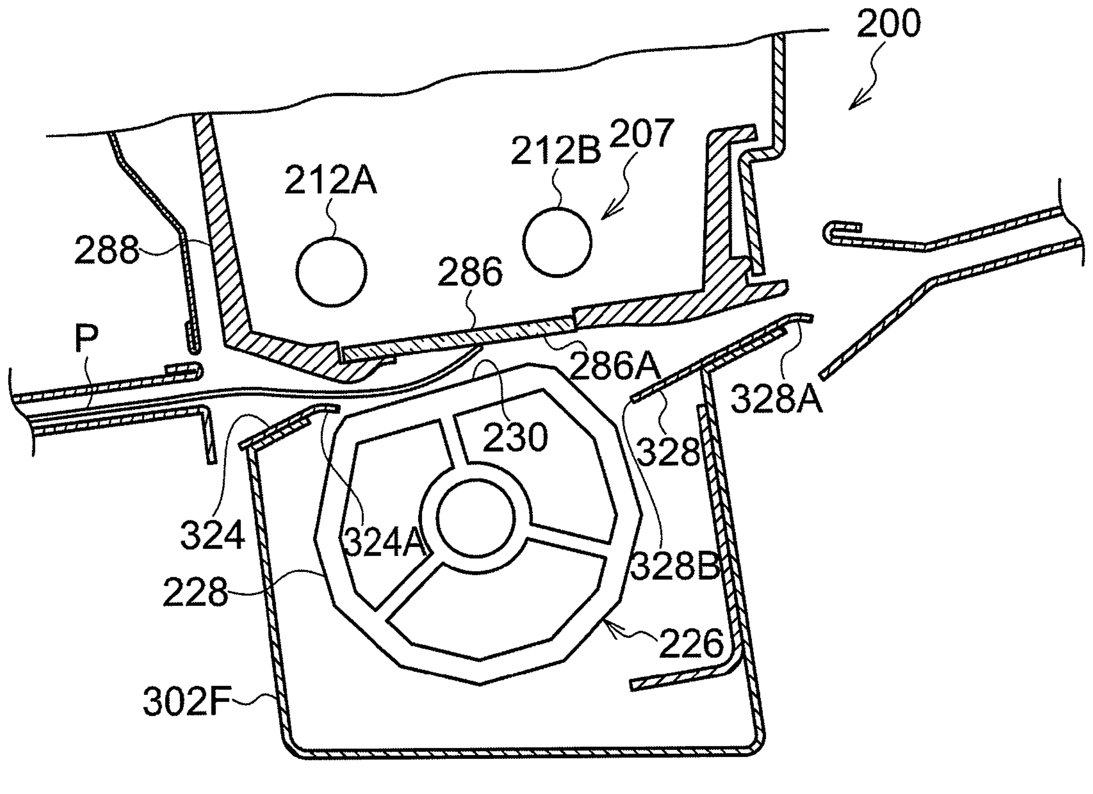
FIG. 9 is an explanatory diagram showing the state where the recording medium P with upward curling is conveyed in the inline sensor concerning the exemplary embodiment of the present invention.

On the other hand, as shown in FIG. 9, in a case where the front end part of the recording medium P conveyed to the inline sensor 200 is curled in a concave shape (a shape in which the front part is inclined upward along the conveying direction) when viewed from a direction perpendicular to the conveying direction, when the front end part of the recording medium P passes beyond the reference roll 226, the front end part contacts the lower chute member 328. Thus, the front end part of the recording medium P does not enter the gap d3 (refer to FIG. 7A) between the reference roll 226 and the lower chute member 328. In addition, when conveying a recording medium P without any curling, since this corresponds to a case in which the size of curling at the front part of the recording medium P is small in FIG. 8A and FIG. 8B and the operation is similar to that with respect to downward curling, explanation is omitted.

The present invention is not limited to the above-mentioned exemplary embodiment.

An image detection may be performed using a contact-type sensor substituted for the window glass 286, or using contact-type sensors as an optical sensor part including the CCD sensor 204 while the window glass 286 is in that condition. Moreover, one of the end portion 237 at the upstream side of the evacuation surface 230 and the end portion 239 at the downstream side thereof may has a curved shape. Further, a fixed opposing member may be used in place of the reference roll 226 which is rotatable. In addition, although the light is given from the front surface side of the recording medium P in this exemplary embodiment, the light may be given from the back surface side of the recording medium P, in a case of using the recording medium P or the like which transmits the light.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detecting apparatus comprising:

a transmission member that is provided facing a conveying path on which a medium is conveyed and that transmits light from the medium being conveyed on the conveying path;

a detecting section that detects the medium or an image on the medium from the light which is transmitted through the transmission member, wherein the light is received by a light-receiving member of the detection section;

an opposing member that is provided on an opposite side of the conveying path from the transmission member and has at least an opposing surface that faces the transmission member; and a guide member that is provided at a downstream side of the opposing member in the conveying direction, and guides the medium downstream in the conveying path, wherein the opposing surface is closer to the detecting section at a downstream side than at an upstream side thereof in the conveying direction.

2. The detecting apparatus according to claim 1, wherein the opposing member has a first opposing surface and a second opposing surface and is rotated to switch between the first opposing surface and a second opposing surface depending on whether or not detection is performed by the detecting section, and the first opposing surface faces the transmission member when detection is not performed by the detecting section.

3. The detecting apparatus according to claim 1, wherein at least one of an end portion at the upstream side or an end portion at the downstream side of the opposing surface in the conveying direction is formed in a curved shape.

4. The detecting apparatus according to claim 1, wherein an end portion at the downstream side of the guide member is curved in a direction diverging from the conveying path.

5. An image forming apparatus comprising:

an image forming section that forms an image on a medium;

a conveying section that conveys the medium on which the image is formed by the image forming section; and a detecting apparatus according to claim 1, that detects the image on the medium conveyed by the conveying section.

6. A detecting apparatus comprising:

a transmission member that is provided facing a conveying path on which a medium is conveyed and that transmits light from the medium being conveyed on the conveying path;

a detecting section that detects the medium or an image on the medium from the light which is transmitted through the transmission member;

an opposing member that is provided on an opposite side of the conveying path from the transmission member and has a plurality of opposing surfaces which are capable of facing the transmission member; and a guide member that is provided at a downstream side of the opposing member in the conveying direction, and guides the medium downstream in the conveying path, wherein when detection is not performed by the detecting section, a first opposing surface of the plurality of opposing surfaces faces the transmission member, and is closer to the detecting section at a downstream side than at an upstream side thereof in the conveying direction.

7. The detecting apparatus according to claim 6, wherein the opposing member is rotatably supported, and the first opposing surface is positioned to face the transmission member when detection is not performed by the detecting section.

8. The detecting apparatus according to claim 6, wherein the first opposing surface is formed with a substantially flat surface, and the first opposing surface is inclined with respect to a transmission surface of the transmission member in a state in which the first opposing surface is in a position facing the transmission member.

9. The detecting apparatus according to claim 6, wherein the first opposing surface is formed so as to diverge further from a transmission surface of the transmission member than another opposing surface in a state in which the first opposing surface or the another opposing surface is in a position facing the transmission member.

10. The detecting apparatus according to claim 6, wherein at least one of an end portion at the upstream side or an end portion at the downstream side of the first opposing surface in the conveying direction is formed in a curved shape.

11. The detecting apparatus according to claim 6, wherein in a state in which the first opposing surface is in a position facing the transmission member, an end portion at the upstream side of the guide member is positioned further apart from the conveying path than an end portion at the downstream side in the conveying direction of the first opposing surface, and is curved in a direction diverging from the conveying path.

12. An image forming apparatus comprising:

an image forming section that forms an image on a medium;

a conveying section that conveys the medium on which the image is formed by the image forming section; and a detecting apparatus according to claim 6, that detects the image on the medium conveyed by the conveying section.

* * * * *